3,340,229
POLYCARBONATES PREPARED FROM A BIS-
(HALO-p-HYDROXYCUMYL)BENZENE
Logan C. Bostian, Morris Township, Morris County,
Richard B. Lund, Whippany, Bryce C. Oxenrider,
Florham Park, and George J. Schmitt, Madison, N.J.,
assignors to Allied Chemical Corporation, New York,
N.Y., a corporation of New York
No Drawing. Filed Oct. 4, 1962, Ser. No. 228,789
11 Claims. (Cl. 260—47)

This invention relates to new halogenated polycarbonates, and more particularly, refers to polycarbonates prepared from 1,3-bis(halo-p-hydroxycumyl)benzene and 1,4-bis(halo-p-hydroxycumyl)benzene and a process for their preparation.

Polycarbonate resins are one of the newest and most versatile of modern plastics. Their commercial success has been due to their outstanding chemical and mechanical properties which render them useful as fibers, surface coatings, industrial castings, high strength adhesives and durable laminates for all varieties of electrical and electronical apparatus.

The area of polycarbonate application is limited, however, to those industrial needs which do not demand exceptionally high dimensional stability at elevated temperatures. Also, since polycarbonates are flame supporting, costly and inconvenient procedures must be observed in order to maintain a minimum standard of safety.

Accordingly, an object of this invention is to provide new 1,3-bis(halo-p-hydroxycumyl)benzene and 1,4-bis(halo - p - hydroxycumyl)benzene polycarbonate resins which possess high thermal stability, glass transition temperatures, flow point ranges and are flame retardant. Another object of this invention is to provide a process for the preparation of such halogenated polycarbonate resins having high molecular weights with narrow molecular weight distribution. Other objects will become apparent from the following description.

The polycarbonates of the present invention are white solids and may be chemically described as polycarbonates having recurring units of the following formula:

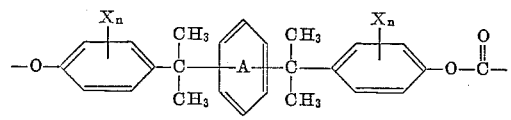

wherein the two halo-p-oxycumyl groups are attached to nonadjacent carbon atoms of the benzene nucleus A, X is a halogen selected from the group consisting of chlorine and bromine and $n$ is an integer from 1 to 4.

The high molecular weight halogenated polycarbonates of the present invention not only eliminate the risk of flammability but also exhibit exceptional and superior dimensional stability at elevated temperatures as evidenced by their exceptionally high glass transition temperature and high flow point ranges.

In accordance with the present invention, these halogenated polycarbonates may be produced by reacting phosgene with a bisphenol selected from the group consisting of 1,3-bis(halo-p-hydroxycumyl)benzene and 1,4-bis(halo-p-hydroxycumyl)benzene in an alkaline medium.

The halogenated bisphenols of this reaction may be represented by the following general formulas:

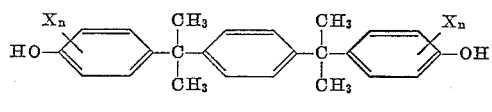

1,4-bis(halo-p-hydroxycumyl)benzene and

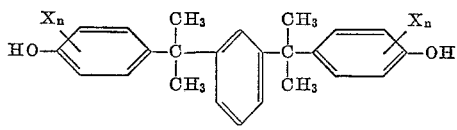

1,3-bis(halo-p-hydroxycumyl)benzene wherein X is a halogen selected from the group consisting of chlorine and bromine and $n$ is an integer from 1 to 4.

These halogenated bisphenols and a process for their preparation are disclosed and claimed in co-pending application of Lund et al., Ser. No. 228,227, filed of even date.

Illustrative of the halogenated bisphenols which may be successfully utilized in the present invention are 1,3-bis(3,5-dichloro-p-hydroxycumyl)benzene
1,3-bis(3-chloro-p-hydroxycumyl)benzene
1,3-bis(2,3,5,6-tetrachloro-p-hydroxycumyl)benzene
1,3-bis(3,5-dibromo-p-hydroxycumyl)benzene
1,3-bis(3-bromo-p-hydroxycumyl)benzene
1,3-bis(2,3,5,6-tetrabromo-p-hydroxycumyl)benzene
1,4-bis(3,5-dichloro-p-hydroxycumyl)benzene
1,4-bis(3-chloro-p-hydroxycumyl)benzene
1,4-bis(2,3,5,6-tetrachloro-p-hydroxycumyl)benzene
1,4-bis(3,5-dibromo-p-hydroxycumyl)benzene
1,4-bis(3-bromo-p-hydroxycumyl)benzene
1,4-bis(2,3,5,6-tetrabromo-p-hydroxycumyl)benzene.

The phosgenation of 1,3-bis(halo-p-hydroxycumyl)benzene or 1,4-bis(halo-p-hydroxycumyl)benzene in an alkaline medium may be effected by employing either solution or emulsion polymerization procedures.

In solution polymerization a substantially anhydrous reaction medium is employed and is generally comprised of a tertiary amine such as tributylamine, triethylamine, pyridine, α-picoline and the like.

Emulsion polymerization, on the other hand, comprises phosgenating an agitated reaction mixture comprised of an aqueous alkaline solution, containing as dissolved or suspended material, 1,3-bis(halo-p-hydroxycumyl)benzene or 1,4-bis(halo-p-hydroxycumyl)benzene in the presence of a water-immiscible inert organic solvent and a suitable polymerization catalyst. This latter procedure is to be preferred since it lends many facets for realizing high yields of halogenated polycarbonate resins of high molecular weight having narrow molecular weight distribution.

Usually emulsion polymerization procedures produce polycarbonate resins having high molecular weight only after employing prolonged post-phosgenation periods. In some instances these prolonged molecular growth periods range up to several days. Even though such periods produce high molecular weight material in sufficient yields, it has been found that the polycarbonate resins produced thereby possess wider molecular weight distribution. Polycarbonate resins having a wide molecular weight distribution are undesirable since they contain large factors of both low and high molecular weight polymer. A large factor of low molecular weight polymer negatively effects physical properties of the polycarbonate resin and, in particular, tensile strength. A large factor of high molecular weight polymer increases melt viscosity which, in turn, necessitates the employment of elevated temperatures in conventional extrusion and injection molding procedures.

In order to secure 1,3-bis(halo-p-hydroxycumyl)benzene or 1,4-bis(halo-p-hydroxycumyl)benzene polycarbonates having high molecular weight with narrow molecular weight distribution, and more particularly, halogenated polycarbonate resins of high glass transition temperatures and high flow point ranges, it is an essential feature that the initial amount of alkali present in the reaction mixture be controlled, followed by a post-phosgenation period wherein a suitable post-phosgenation molecular growth catalyst is added with additional alkali which substantially accelerates molecular growth.

The criticality of controlled alkalinity arises since an intermediate haloformate derivative of 1,3-bis(halo-p-hydroxycumyl)benzene or 1,4-bis(halo-p-hydroxycumyl)benzene is produced prior to substantial polymerization. Hydrolysis of the haloformate derivative so produced is relatively slow in water but rapidly increases with higher hydroxyl ion concentration. Thus, the presence of the halogen atoms render the carbonyl group of the intermediate haloformate derivatives more positive and, therefore, more susceptible to attack by anions produced by the alkali present in the reaction system. This, of course, results in excessive salt contamination and destruction of the perpetuating haloformate end-groups.

The necessity for controlling the initial amount of alkali added to the reaction mixture has been found to be particularly critical for the efficient production of polycarbonates prepared from 1,4-bis(halo-p-hydroxycumyl)benzene. More specifically, where an initial molar ratio of alkali to 1,4-bis(halo-p-hydroxycumyl)benzene exceeds 2:1, only relatively low molecular weight polycarbonate resins are obtained. In order to secure high molecular weight polycarbonate resins when employing a molar ratio in excess of 2:1, additional phosgene and alkali must be added to the reaction mixture. Such intermediate phosgenation procedures are both time consuming and costly. Nevertheless, the high molecular weight polycarbonate resin of 1,4-bis(halo-p-hydroxycumyl)benzene so obtained exhibits a wide molecular weight distribution which is not desirable for those reasons hereinbefore stated. Accordingly, if polycarbonate resins prepared from 1,4-bis(halo-p-hydroxycumyl)benzene having high molecular weight with narrow molecular weight distribution are to be secured an initial mol ratio from about 1 to 2 mols alkali per mol 1,4-bis(halo-p-hydroxycumyl)benzene and preferably from 1.4 to 1.6 mols is employed.

It is most desirable in the preparation of polycarbonates prepared from both 1,3-bis(halo-p-hydroxycumyl)benzene and 1,4-bis(halo-p-hydroxycumyl)benzene that the procedure of controlled alkalinity be employed in order to reduce reaction of hydroxyl ions with haloformate end-groups. It should also be noted that molar ratios less than 1 mol alkali per mol halogenated bisphenol produces low molecular weight halogenated polycarbonate resins thereby rendering the process uneconomical and inefficient. For highest quality and yield it is preferred to employ initial molar ratios in the range of 1 to 2 mols alkali per mol 1,3-bis(halo-p-hydroxycumyl)benzene or 1,4-bis(halo-p-hydroxycumyl)benzene and preferably 1.4 to 1.6:1.

The term alkali as employed in the present process is defined to include alkali metal hydroxides and alkaline earth metal hydroxides such as sodium hydroxide, potassium hydroxide, lithium hydroxide, calcium hydroxide, barium hydroxide and the like.

The molar ratio of the reactants should be about 1 mol to about 4 mols of phosgene per mol of 1,3-bis(halo-p-hydroxycumyl)benzene. Less than equimolar ratios produce insufficient yields while an excess of 4 mols is not only left unconsumed but also reacts with the aqueous alkaline medium to produce unnecessary contamination. For highest yields and efficiency, molar ratios of about 1 to 2 mols phosgene per mol of 1,3-bis(halo-p-hydroxycumyl)benzene or 1,4-bis(halo-p-hydroxycumyl)benzene have been found to produce their corresponding halogenated polycarbonates in yields of about at least 70 percent of theoretical. Completion of reaction is usually detected by a sharp decrease in the pH of the reaction system, normally a decrease below about seven.

The reaction temperature employed is not critical and may vary over a wide range, i.e. from about 15° C. to about 80° C. It is preferred, however, to maintain the reaction temperature from about 15° to 30° C. in order to minimize excessive discoloration due to oxidation effects. Such temperatures may readily be secured by controlling the introductory rate of phosgene which, in turn, regulates the exothermic heat of recation and thereby minimizes, and in some instances, completely eliminates the necessity of heat dissipating equipment. Of course the temperature may increase or decrease with a corresponding increase or decrease of pressure employed in the reaction system.

The organic water-insoluble phase generally consists of an organic hydrocarbon which is a solvent for the resulting halogenated polycarbonate, inert under the conditions of reaction and which allows for elevated reaction temperatures, if desired. Generally, chlorinated aliphatic hydrocarbons such as methylene chloride, ethylene chloride or 1,1,2-trichloroethylene have been found to be suitable but other chlorinated hydrocarbons or chlorinated or alkylated benzene derivatives may also be successfully empolyed. The amount of solvent is not critical, but from about one to twenty parts by weight, preferably five to fifteen parts, per part of halogenated polycarbonate resin formed are usually employed.

The above described procedure produces a haloformate rich prepolymer in the water-immiscible organic solvent. The preferred operation for producing such a prepolymer solution rich in haloformate end-groups comprises preparing a reaction mixture comprised of a halogenated bisphenol selected from the group consisting of 1,3-bis(halo-p-hydroxycumyl)benzene and 1,4-bis(halo-p-hydroxycumyl)benzene in an aqueous alkaline solution containing from about 1.4 to 1.6 mols alkali per mol halogenated bisphenol in the presence of a chlorinated aliphatic hydrocarbon, agitating the resulting mixture so as to create an emulsion thereof and introducing phosgene in a molar ratio of about 1 to 2 mols per mol halogenated bisphenol at a recation temperature from about 15° to 30° C.

Upon securing this prepolymer organic solution, a post-phosgenation period is then commenced which is designed for rapid molecular growth producing halogenated polycarbonate resins of narrow molecular weight distribution.

It is an important feature of the present invention that additional alkali be added to maintain the pH of the reaction mixture above 11, and preferably at least about 12, in order to secure high molecular weight polycarbonate resins. This additional alkali may be added prior to or together with a post-phosgenation molecular growth catalyst.

The post-phosgenation molecular growth catalyst employed in the present invention is an organo-onium halide and may be represented by the formula:

$$[AR_1R_2R_3R_4]^+X^-$$

wherein A is nitrogen, phosphorus and arsenic, $R_1$, $R_2$, $R_3$ and $R_4$ represent like or unlike members of the group consisting of aryl, aralkyl, alkenyl and alkyl and X is a halogen such as chlorine and bromine. Generally from about 0.005 to about 5 percent by weight based upon the amount of 1,3-bis(halo-p-hydroxycumyl)benzene or 1,4-bis(halo-p-hydroxycumyl)benzene charged is employed. Specific examples of such catalysts include:

Trimethylbenzylammonium chloride
Tripropylbenzylammonium chloride
Tetraphenylphosphonium bromide
Tri(isobutyl)benzylammonium chloride
Dimethyldibenzylammonium iodide
Tetrabutylphosphonium bromide
Triethylbenzylammonium chloride
Triethylbenzylammonium fluoride
Tetraphenylarsonium iodide For highest purity, the reaction mixture may be blanketed with an inert gas during the initial phosgenation step and the subsequent post-phosgenation molecular growth period to prevent excessive discoloration by atmospheric oxidation. Suitable inert gases include nitrogen, argon, and the like. Purification may also be assured by employing conventional procedures such as acid washing, filtration, etc.

Final recovery of the halogenated polycarbonate resins may conveniently be secured by evaporating off the organic solvent or by admixing the polycarbonate-containing organic solvent with a non-solvent for the resulting polycarbonate resin. Such non-solvents include acetone, heptane, isooctane and the like. The isolated halogenated polycarbonate resin may then be removed by filtration, dried and stored.

Conventional chain terminators may be employed in order to control molecular weight. Typical examples of terminators are phenol, p-cumylphenol, chlorophenol, nonyl alcohol, butyl alcohol, etc. Discontinuance of molecular growth of 1,3-bis(halo-p-hydroxycumyl)benzene or 1,4-bis(halo-p-hydroxycumyl)benzene polycarbonate is effectively accomplished when the chain terminator is introduced during the post-phosgenation period. Such terminators lend additional means for securing resins of reproducible molecular weight.

Various additives may be employed, such as antioxidants, additives to prevent the decomposition of phosgene and additives to preferentially react with phosgene decomposition products. Typical of such additives are sodium dithionite, potassium bisulfite, carbon monoxide, etc.

The following examples are given for the purpose of illustration. In the examples parts are by weight.

*Example 1*

24.2 parts of 1,3-bis(3,5-dichloro-p-hydroxycumyl) benzene were dissolved in 200 parts of a 2.5 percent by weight aqueous solution of sodium hydroxide at a temperature of 20° C. and under a blanket of nitrogen in a reaction vessel equipped with a reflux condenser, thermometer, gas inlet tube and mechanical stirrer. After solution was complete, 266 parts of methylene chloride were added followed by the controlled addition of phosgene in order to maintain the reaction temperature of 20° C. for a period of about 45 minutes until the pH of the reaction mixture decreased to about 6. 13.5 parts of a 10 percent by weight aqueous solution of benzyltriethylammonium chloride and an additional 4 parts of sodium hydroxide were added. The reaction system was then stirred at a temperature of 20° C. for a period of 30 minutes until the resulting mixture became viscous. An additional 280 parts of methylene chloride were added and the lower organic layer was separated and washed with a 5 percent by weight aqueous hydrochloric acid solution followed by water until the water-washings possessed a pH of 6. Removal of the aqueous layer was effected by decantation and the remaining organic layer was slowly added to 185 parts of stirred acetone whereupon the crude 1,3 - bis(3,5-dichloro-p-hydroxycumyl)benzene polycarbonate precipitated out as a rubber-like material. The precipitate was removed by filtration and again added to 780 parts of vigorously stirred acetone and within 1.5 hours a precipitate in form of a powder resulted. The 1,3-bis(3, 5 - dichloro-p-hydroxycumyl)benzene polycarbonate was again isolated by filtration and dried in a vacuum oven. 21.5 parts of 1,3-bis(3,5-dichloro-p-hydroxycumyl)benzene polycarbonate corresponding to a yield of 84 percent of theoretical was obtained. Physical analysis showed the 1,3 - bis(3,5-dichloro-p-hydroxycumyl)benzene polycarbonate possessed an inherent viscosity of 1.065, glass transition point of 158° C., and a flow point range of 225° to 260° C.

*Example 2*

To the reaction vessel employed in Example 1 was added 24.2 parts of 1,4-bis(3,5-dichloro-p-hydroxycumyl) benzene dissolved in 200 parts of a 2.5 percent by weight aqueous sodium hydroxide solution. After solution was attained, 0.068 part of α-(p-hydroxyphenyl)cumene, as chain-terminator, was added with 294 parts of 1,1,2-trichloroethylene and phosgene was introduced into the resulting two-phase reaction mixture until the pH of the system decreased to 6. 13 parts of a 10 percent by weight aqueous solution of benzyltriethylammonium chloride and an additional 4 parts of sodium hydroxide were added to the reaction mixture followed by stirring for a period of 2 hours. A second addition of phosgene was introduced until the pH of the reaction mixture decreased to 7 followed by a third addition of 2.0 parts of sodium hydroxide while continuing to stir the reaction mixture for a period of 30 minutes to assure complete reaction. The reaction system was then allowed to separate and the aqueous phase was removed by decantation. The remaining organic phase was washed once with a 5 percent by weight aqueous solution of hydrochloric acid and then with water until the water-washings possessed a pH of 6. The neutralized organic phase was then slowly poured into a rapidly stirred solution of 1400 parts of isooctane. The resulting 1,4-bis(3,5-dichloro-p-hydroxycumyl)benzene polycarbonate then precipitated out as a fine white powder, isolated by filtration and dried for 18 hours in a vacuum oven maintained at a temperature of 100° C. and a pressure of 1 mm. mercury. 22.7 parts of 1,4-bis(3,5-dichloro-p-hydroxycumyl)benzene, having a flow point of 220° to 240° C. were obtained.

Substantially the same procedure employed in Examples 1 and 2 was repeated. Examples 3 to 5 given in Table I illustrate the physical properties of polycarbonates obtained in a recation mixture containing 2.5 mols alkali per mol 1,3-bis(halo-p-hydroxycumyl)benzene or 1,4-bis (halo-p-hydroxycumyl)benzene and, as in Example 2, a second phosgene addition was carried out in the preparation of 1,4-bis(halo-p-hydroxycumyl)benzene polycarbonate. Examples 6 to 10 given in Table II illustrate those physical properties wherein a molar ratio of 1.5:1 is employed and also illustrate the elimination of the need for additional phosgenation in the case of 1,4-bis(halo-p-hydroxycumyl)benzene polycarbonate. In the examples 1,3-bis(3,5-dichloro-p-hydroxycumyl)benzene is referred to as meta-bisphenol and 1,4-bis(3,5-dichloro-p-hydroxycumyl)benzene is referred to as para-bisphenol.

TABLE I

| Example | Bisphenol | Glass Transition, °C. | Inherent Viscosity | Flow Point, °C. | Yield, Percent wt. |
|---|---|---|---|---|---|
| 3 | Meta | 159 | 0.77 | 205–220 | 74 |
| 4 | Para | 204 | 0.756 | 285–300 | 67 |
| 5 | do | *ND | 0.96 | 290–310 | 88 |

*Not determined.

TABLE II

| Example | Bisphenol | Glass Transition, °C. | Inherent Viscosity | Flow Point, °C. | Yield, Percent wt. |
|---|---|---|---|---|---|
| 6 | Para | 210 | 0.60 | 315–324 | 70 |
| 7 | do | 211 | 0.62 | 295–308 | 74 |
| 8 | do | ND | 0.63 | 290–300 | 82 |
| 9 | do | ND | 1.07 | 290–300 | 78 |
| 10 | Meta | ND | 1.01 | 230–240 | 82 |

*Example 11*

To the reaction vessel employed in Example 1 are added 33.1 parts of 1,4-bis(3,5-dibromo-p-hydroxycumyl)benzene and 200 parts of a 1.5 percent by weight aqueous hydroxide solution. After solution is attained, 266 parts of methylene chloride are added and the resulting reaction mixture is agitated so as to create an emulsion thereof. Phosgene is then introduced into the reaction mixture until the pH of the system decreases to 6. 13 parts of a 10 percent by weight aqueous solution of benzyltriethylammonium chloride and an additional 4 parts of sodium hydroxide are added to the reaction mixture followed by stirring for a period of 2 hours. After acidifying the resulting reaction mixture with hydrochloric acid, the emulsion is allowed to separate and the aqueous phase is discarded. The remaining organic phase containing the dissolved 1,4 - bis(3,5 - dibromo-p-hydroxycumyl)benzene polycarbonate is washed with successive portions of water until the wash-water exhibits a pH of 6. The organic solvent is then added to 1200 parts of rapidly agitated heptane which effects precipitation of 1,4-bis(3,5-dibromo-p-hydroxycumyl)benzene polycarbonate. The resulting polycarbonate resin is then isolated by filtration, dried in a vacuum oven and finally stored.

In the above examples, glass transition temperatures were determined according to the procedure described in ASTM D–1043 (Clash-Berg). The inherent viscosities were determined on 0.5 percent by weight polycarbonate solution in tetrachloroethane at temperature of 25° C. in a Ubbelohde viscometer and flow point ranges determined by a hot stage microscope. It should be noted that the above flow point data shows a substantial decrease in flow differential which indicates narrow molecular weight distribution.

Infrared spectra showed the presence of carbonate linkage (8.1 microns), gem substitution of a carbon (7.2 and 7.3 microns), substitution of an electron donating group ortho to the carbonate linkage (5.55 microns), 1,2,3,5 substitution on an aromatic link (11.5 microns) and an aromatically substituted chlorine (12.3 microns). The infrared spectra also showed meta substitution (12.5 and 14.1 microns) in the case of 1,3-bis(3,5-dichloro-p-hydroxycumyl)benzene and para substitution (12.0 microns) in the case of 1,4-bis(3,5-dichloro-p-hydroxycumyl)benzene. These data are in complete agreement with the theoretical polymer structure of the subject polycarbonates.

Dimensional stability was further evidenced by experiments which indicated that 1,3-bis(halo-p-hydroxycumyl)benzene polycarbonate and 1,4-bis(halo-p-hydroxycumyl)benzene polycarbonate exhibited minimum tendency to crystallize even at elevated temperatures over a substantial period of time. Hand-drawn monofilaments of 1,4-bis(3,5-dichloro-p-hydroxycumyl)benzene were subjected to the following conventional crystallization procedures:

(a) Heated to temperature of 185° C. for a period of 120 hours in an evacuated tube.

(b) Heated in boiling acetone, i.e. 56.5° C., for a period of 3 hours followed by drying in a vacuum oven maintained at temperature of 50° C. and pressure of about 1 mm. mercury for 24 hours.

(c) Heated in boiling heptane at 98° C. for 3 hours and vacuum dried under the conditions of procedure (b). X-ray patterns of these polycarbonate monofilaments showed only diffused rings and a minimum degree of crystallinity. These data indicated that the polycarbonates of the present invention may be placed in storage for an extended period of time at elevated temperatures without loss of their homogeneous character.

1,4 - bis(3,5-dichloro-p-hydroxycumyl)benzene polycarbonate having an inherent viscosity of 0.95 and flow point of 295° to 315° C. was melt spun into monofilament using a small ram extruder. Extruded monofilament was quenched in air and in a water bath at room temperature. When samples of these monofilaments were stretched at a draw ratio of 3.5:1 at temperature of 150° C., a polycarbonate with a drawn denier of 278 and having an ultimate tensile strength of 2.68 grams per denier, 7.1 percent ultimate elongation and a tensile modulus of 67.0 grams per denier was obtained. When stretched at a draw ratio of 4.34:1 at 245° C. the drawn denier was 539 and the monofilament had an ultimate tensile strength of 1.49 grams per denier, an ultimate elongation of 13.6 percent and a tensile modulus of 35.9 grams per denier. The above procedure clearly illustrates the fiber forming properties of these new polycarbonates.

Although certain preferred embodiments of the invention have been disclosed for purpose of illustration, it will be evident that various changes and modifications may be made therein without departing from the scope and spirit of the invention.

We claim:

1. A halogenated polycarbonate resin consisting essentially of recurring units of the formula:

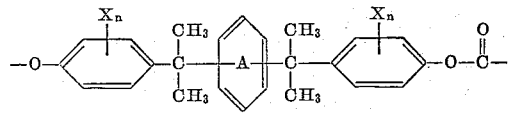

wherein the two halo-p-oxycumyl groups are attached to non-adjacent carbon atoms of the benzene nucleus A, X is a halogen selected from the group consisting of chlorine and bromine and $n$ is an integer from 1–4.

2. A halogenated polycarbonate resin consisting essentially of recurring units of the formula:

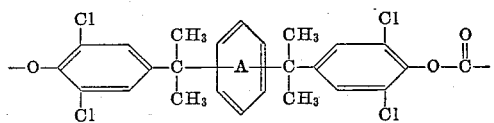

wherein the two dichloro-p-oxycumyl groups are attached to non-adjacent carbon atoms of the benzene nucleus A.

3. A halogenated polycarbonate resin as defined in claim 2 further characterized as having an inherent viscosity of from about 0.6 to 1.1 measured at 25° C. as a 0.5% solution in tetrachloroethane.

4. A halogenated polycarbonate resin consisting essentially of recurring units of the formula:

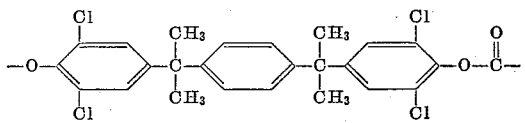

5. A halogenated polycarbonate resin as defined in claim 4 further characterized as having an inherent viscosity of from about 0.6 to 1.1 measured at 25° C. as a 0.5% solution in tetrachloroethane.

6. A halogenated polycarbonate resin as defined in claim 4 further characterized as having an inherent viscosity of about 1 measured at 25° C. as a 0.5% solution in tetrachloroethane.

7. A filamentary body comprising a halogenated polycarbonate as defined in claim 6.

8. A halogenated polycarbonate resin consisting essentially of recurring units of the formula:

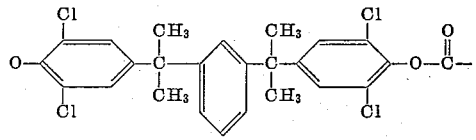

9. A halogenated polycarbonate resin as defined in claim 8 further characterized as having an inherent viscosity of about 0.7 to 1.1 measured at 25° C. as a 0.5% solution in tetrachloroethane.

10. A halogenated polycarbonate as defined in claim 8 further characterized as having an inherent viscosity of about 1 measured at 25° C. as a 0.5% solution in tetrachloroethane.

11. A solid halogenated polycarbonate resin consisting essentially of recurring units of the formula:

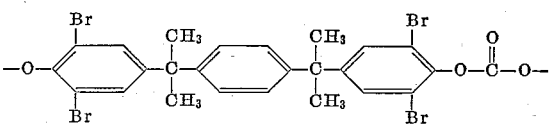

(References on following page)

References Cited

UNITED STATES PATENTS

| | | | |
|---|---|---|---|
| 3,043,800 | 7/1962 | Schnell et al. | 260—47 |
| 3,062,781 | 11/1962 | Bottenbruch et al. | 260—47 |
| 3,160,606 | 12/1964 | Dietrich et al. | 260—47 |
| 3,232,993 | 2/1966 | Vitrone | 260—47 |
| 3,251,805 | 5/1966 | Schnell et al. | 260—47 |

FOREIGN PATENTS

| | | |
|---|---|---|
| 1,293,289 | 4/1962 | France. |
| 932,811 | 7/1963 | Great Britain. |

SAMUEL H. BLECH, *Primary Examiner.*